US006987854B2

(12) United States Patent
Maillard

(10) Patent No.: US 6,987,854 B2
(45) Date of Patent: Jan. 17, 2006

(54) METHOD AND APPARATUS FOR RECORDING OF ENCRYPTED DIGITAL DATA

(75) Inventor: Michel Maillard, Rambouillet (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 706 days.

(21) Appl. No.: 09/928,648

(22) Filed: Aug. 13, 2001

(65) Prior Publication Data

US 2002/0048367 A1 Apr. 25, 2002

Related U.S. Application Data

(63) Continuation-in-part of application No. 09/523,125, filed on Mar. 10, 2000, now abandoned, which is a continuation of application No. PCT/IB98/01511, filed on Sep. 22, 1998.

(51) Int. Cl.
  *G06F 1/24* (2006.01)

(52) U.S. Cl. .................. 380/210; 380/239; 713/193; 713/200; 713/201

(58) Field of Classification Search ............. 380/210, 380/239; 713/193, 200, 201
See application file for complete search history.

(56) References Cited

U.S. PATENT DOCUMENTS

| 4,908,834 | A |   | 3/1990  | Wiedemer ............... 380/5 |
|-----------|---|---|---------|-------------------------------|
| 5,825,876 | A |   | 10/1998 | Peterson, Jr. .......... 380/4 |
| 5,991,400 | A |   | 11/1999 | Kamperman ............ 380/9   |
| 6,055,314 | A |   | 4/2000  | Spies et al. ........... 380/21 |
| 6,246,767 | B1| * | 6/2001  | Akins et al. .......... 380/210 |
| 6,560,340 | B1| * | 5/2003  | Akins et al. .......... 380/239 |

FOREIGN PATENT DOCUMENTS

| EP | 0 858 184 A2 | 8/1998 |
| GB | 2 132 860 A  | 7/1984 |
| GB | 2 322 030 A  | 8/1998 |
| WO | WO 97/16924  | 5/1997 |

* cited by examiner

*Primary Examiner*—Thomas R. Peeso
(74) *Attorney, Agent, or Firm*—Osha Liang LLP

(57) ABSTRACT

A method of transmitting and recording digital data scrambled using a control word. The scrambled data is transmitted together with the control word, and the method includes encrypting the control word with a first key. The encrypted control word is transmitted and received, and then decrypted with a decoder that includes an equivalent of the first key. The control word is re-encrypted with a second key stored in a portable support device that is received by the decoder, and the portable support device may be used with any suitable decoder. The re-encrypted control word and the scrambled digital data are recorded on a digital recording medium.

An apparatus for transmitting and recording digital data scrambled using a control word. The scrambled data is transmitted together with the control word, and the apparatus includes a transmitter that encrypts the control word with a first key and transmits the encrypted control word. A decoder receives the encrypted control word and decrypts the control word. A portable support device including a second key is received by the decoder, and the decoder uses the second key to re-encrypt the decrypted control word and record the re-encrypted control word and the scrambled digital data on a digital recording medium. The portable support device may be used with any suitable decoder or digital recorder.

26 Claims, 6 Drawing Sheets

METHOD AND APPARATUS FOR RECORDING OF ENCRYPTED DIGITAL DATA

CROSS-REFERENCE TO RELATED APPLICATIONS

This application is a continuation-in-part of U.S. patent application Ser. No. 09/523,125, filed on Mar. 10, 2000 now abandoned, which is a continuation of PCT Application No. PCT/IB98/01511, filed on Sep. 22, 1998.

BACKGROUND OF INVENTION

1. Field of the Invention

The invention relates generally to encrypting and decrypting digital transmissions. More specifically, the invention relates to a method and apparatus for recording and retrieving encrypted digital data.

2. Background Art

Transmission of encrypted data is well-known in the field of pay TV systems, where scrambled audiovisual information is broadcast typically by satellite to a number of subscribers, each subscriber possessing a decoder or receiver/decoder capable of descrambling the transmitted program for subsequent viewing.

In a typical system, scrambled digital data is transmitted together with a control word for descrambling the digital data, the control word itself being encrypted by a first key and transmitted in encrypted form, the scrambled digital data and encrypted code word being received by a decoder possessing an equivalent of the first key necessary to decrypt the encrypted code word and thereafter descramble the transmitted data. A paid-up subscriber will receive on a monthly basis the key necessary to decrypt the encrypted control word so as to permit viewing of a particular program.

With the advent of digital technology, the quality of the transmitted data has substantially increased. A particular problem associated with digital quality data lies in its ease of reproduction. Where a descrambled program is passed via an analog link for viewing and recording by a standard VCR, the quality is typically no greater than that associated with a standard analog cassette recording. The risk that such a recording may be used as a master tape to make pirate copies is thus no greater than with a standard purchased analog cassette recording.

In contrast, any descrambled digital data passed via a direct digital link to a new generation digital recording device (for example, a DVHS recorder) will be of the same quality as the originally transmitted program and may thus be reproduced any number of times without any degradation of image or sound quality. There is, therefore, a considerable risk that the descrambled data will be used as a master recording to make pirate copies, including additional digital copies or analog VHS copies.

French Patent Application 95 03859 shows one method of overcoming this problem with a system in which descrambled digital data is never allowed to be recorded on the digital recording medium. Instead, the decoder described in this application records the data in its scrambled form on the recording medium together with the control word necessary to descramble the data re-encrypted by means of another key. This new key is known only to the receiver/decoder and replaces the first key needed to obtain the code word for viewing the program.

One advantage of such a system is that the data is never stored in a clear form and cannot be viewed without possession of the new key, which is stored in the receiver/decoder. The system also has the advantage that, because the first key changes on a monthly basis, the use of a constant key to re-encrypt the control word registered on the digital tape means that the receiver/decoder will still be able to decrypt the control word recorded on the tape even after the end of a subscription month.

SUMMARY OF INVENTION

In one aspect, the invention comprises a method of transmitting and recording digital data scrambled using a control word, the scrambled data being transmitted together with the control word. The method comprises encrypting the control word with a first key, transmitting the encrypted control word, and receiving the encrypted control word. The encrypted control word is decrypted with a decoder comprising an equivalent of the first key. The decrypted control word is re-encrypted with a second key stored in a portable support device adapted to be releasably received by the decoder, the portable support device adapted for use with a plurality of decoders. The re-encrypted control word and the scrambled digital data are recorded on a digital recording medium.

In another aspect, the invention comprises a method of transmitting and recording digital data scrambled using a control word, the scrambled data being transmitted together with the control word. The method comprises encrypting the control word with a first key, transmitting the encrypted control word, and receiving the encrypted control word. The encrypted control word is decrypted with a digital recorder comprising an equivalent of the first key. The decrypted control word is re-encrypted with a second key stored in a portable support device adapted to be releasably received by the digital recorder, the portable support device adapted for use with a plurality of digital recorders. The re-encrypted control word and the scrambled digital data are recorded on a digital recording medium operatively coupled to the digital recorder.

In another aspect, the invention comprises an apparatus for transmitting and recording digital data scrambled using a control word. The scrambled data is transmitted together with the control word. The apparatus comprises a transmitter that encrypts the control word with a first key and transmits the encrypted control word. A decoder receives the encrypted control word and decrypts the control word. A portable support device comprising a second key is adapted to be releasably received by the decoder. The decoder is adapted to use the second key to re-encrypt the decrypted control word and record the re-encrypted control word and the scrambled digital data on a digital recording medium. The portable support device is adapted to be usable in any suitably adapted decoder or digital recorder.

Other aspects and advantages of the invention will be apparent from the following description and the appended claims.

DETAILED DESCRIPTION

Digital Television System

The following detailed description describes the various aspects of the present invention. In the description, the terms "scrambled," "encrypted," "control word," and "key" have been used for the purpose of clarity of language. However, it will be understood that no fundamental distinction is to be made between, for example, "scrambled data" and "encrypted data," or between "control word" and "key." Similarly, while the description refers to "receiver/decoders" and "decoders," it should be understood that the present invention applies equally to embodiments having a receiver integrated with the decoder and to embodiments that include a decoder unit functioning in combination with a physically separate receiver. Moreover, the invention equally extends to embodiments in which the decoder is integrated with other devices, such as televisions or digital video recorders.

Figure 1:
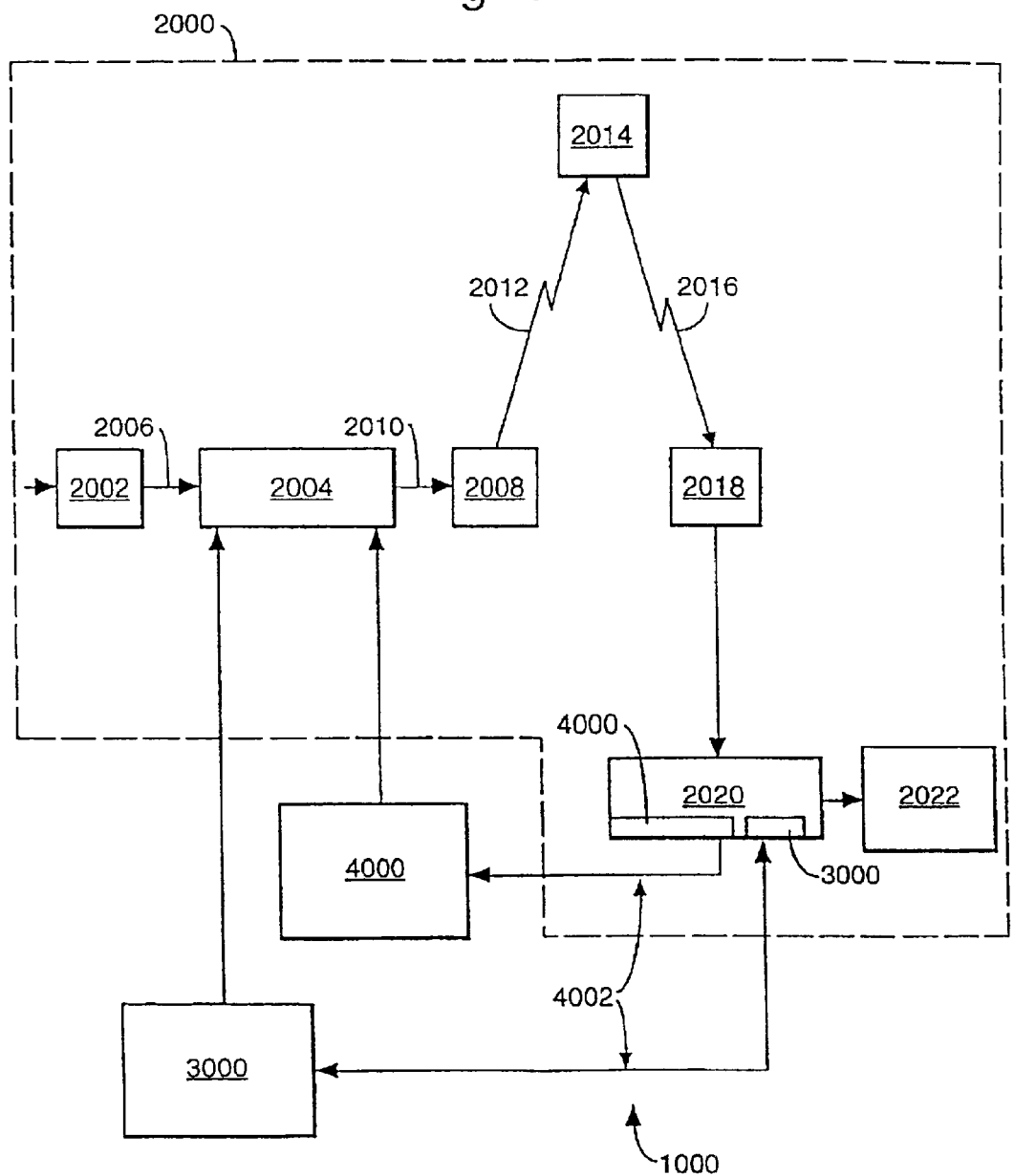
FIG. 1 shows an overall architecture of a digital television system, as may be adapted for use with embodiments of the present invention to interact with a digital recording device.

An overview of a digital television broadcast and reception system 1000 adaptable to the present invention is shown in FIG. 1. The system includes a mostly conventional digital television system 2000 which uses the known MPEG-2 compression system to transmit compressed digital signals. In more detail, the MPEG-2 compressor 2002 in a broadcast center receives a digital signal stream (typically a stream of video signals). The compressor 2002 is connected to a multiplexer and scrambler 2004 by a linkage 2006. The multiplexer 2004 receives a plurality of further input signals, assembles one or more transport streams, and transmits compressed digital signals to a transmitter 2008 of the broadcast center via linkage 2010 (which may be, for example, telecom links and the like). The transmitter 2008 transmits electromagnetic signals via uplink 2012 towards a satellite transponder 2014 where they are electronically processed and broadcast via an international downlink 2016 to an earth receiver 2018 (that may typically comprise, for example, a reception dish owned or rented by the end user). The signals received by the receiver 2018 are transmitted to an integrated receiver/decoder 2020 owned or rented by the end user and connected to the end user's television 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast center and partly in the decoder 2020. The conditional access system 3000 enables the end user to access digital television broadcasts from one or more broadcast suppliers. A "smart card" capable of decrypting messages relating to commercial offers (that is, one or several television programs sold by the broadcast supplier) can be inserted into the receiver/decoder 2020. Note that, in general the term "smart card" is used to refer to any conventional chip-based card device possessing, for example, microprocessor or EEPROM memory. Also included in the smart card definition are chip-based devices having alternative physical forms including, for example key-shaped devices such as those commonly used in TV decoder systems. Moreover, in some embodiments, smart cards may comprise cards with magnetic information. Using the decoder 2020 and smart card, the end user may purchase events in either a subscription mode or a pay-per-view mode. Smart cards and their applications with respect to embodiments of the invention are described in detail below.

An interactive system 4000, also connected to the multiplexer 2004 and the receiver/decoder 2020, and again located partly in the broadcast and partly in the decoder, enables the end user to interact with various applications via a modemed back channel 4002.

Conditional Access System

Figure 2:
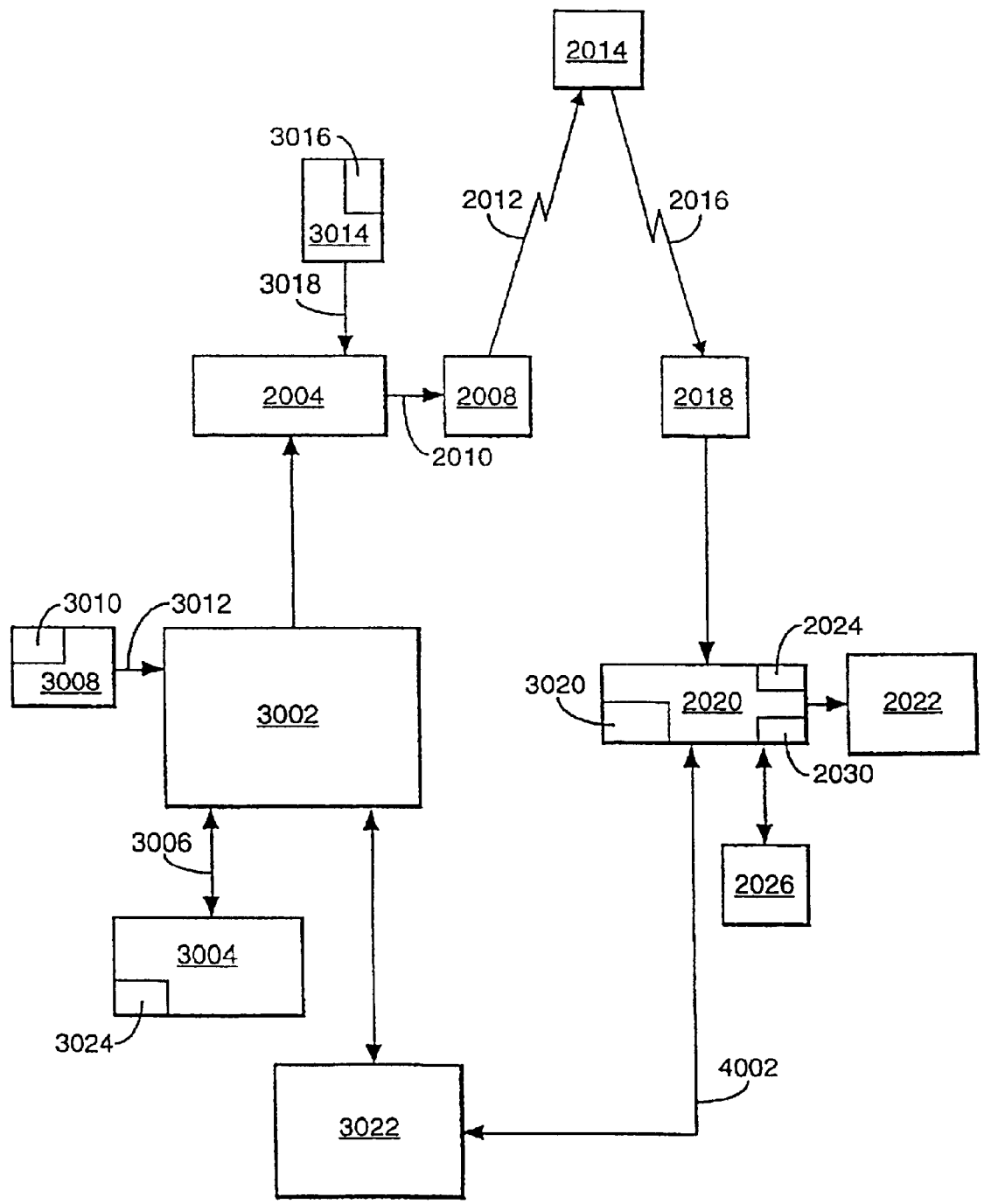
FIG. 2 shows a conditional access system of the television system of FIG. 1.

With reference to FIG. 2, the conditional access system 3000 includes a Subscriber Authorization System (SAS) 3002. The SAS 3002 is connected to one or more Subscriber Management Systems (SMS) 3004, one SMS for each broadcast supplier, by a respective TCP-IP link 3006 (although other types of connections could also be used). Alternatively, one SMS could be shared between two broadcast suppliers, or one supplier could use two SMSs, etc.

First encrypting units in the form of ciphering units 3008 using "mother" smart cards 3010 are connected to the SAS by linkage 3012. Second encrypting units, again in the form of ciphering units 3014 using mother smart cards 3016, are connected to the multiplexer 2004 by linkage 3018. The receiver/decoder 2020 receives a "daughter" smart card 3020, and the receiver/decoder 2020 is connected to the SAS 3002 by communications servers 3022 via the modemed back channel 4002. The SAS 3002 sends, among other information, subscription rights to the daughter smart card 3020 (upon request).

The smart cards contain access codes of one or more commercial operators. The "mother" smart card encrypts different kinds of messages and the "daughter" smart cards decrypt the messages, if they have the right to do so.

The first and second ciphering units 3008 and 3014 comprise a rack, an electronic VME card with software stored on an EEPROM, up to 20 electronic cards and one smart card 3010 and 3016, respectively, for each electronic card, one (card 3016) for encrypting the ECMs, and one (card 3010) for encrypting the EMMs.

As will be described, Entitlement Control Messages (ECMs) are encrypted messages embedded in the data stream of a transmitted program and which contain the control word necessary for descrambling a program. Authorization of a given receiver/decoder is controlled by Entitlement Management Messages (EMMs) transmitted on a less frequent basis, for example every month, and which supply an authorized receiver/decoder with the key necessary to decode the ECM.

The operation of the conditional access system 3000 of the digital television system will now be described in more detail with reference to the various components of the television system 2000 and the conditional access system 3000.

Multiplexer and Scrambler

With reference to FIGS. 1 and 2, in the broadcast center, the digital video signal is first compressed (or bit rate reduced) using the MPEG-2 compressor 2002. The compressed signal is then transmitted to the multiplexer and scrambler 2004 via the linkage 2006 in order to be multiplexed with other data, such as other compressed data.

The scrambler generates a control word Ce used in the scrambling process and included in the MPEG-2 stream in the multiplexer 2004. The control word Ce is generated internally and enables the end user's integrated receiver/decoder 2020 to descramble the program. Access criteria, indicating how the program is commercialized, are also added to the MPEG-2 stream. The program may be commercialized in either one of a number of "subscription" modes and/or one of a number of "Pay Per View" (PPV) modes or events. In the subscription mode, the end user subscribes to one or more commercial offers, or "bouquets," thus obtaining the rights to watch every channel inside those bouquets. In one embodiment, up to 960 commercial offers may be selected from a bouquet of channels. In the PPV mode, the end user is provided with the capability to purchase events as desired. This can be achieved by either pre-booking the event in advance ("pre-book mode"), or by purchasing the event as soon as it is broadcast ("impulse mode").

Both the control word Ce and the access criteria are used to build an Entitlement Control Message (ECM). The ECM comprises a message sent in relation with one scrambled program, and the message comprises a control word (which allows for the descrambling of the program) and the access criteria of the broadcast program. The access criteria and control word are transmitted to the second encrypting unit 3014 via the linkage 3018. In this unit an ECM is generated, encrypted with a first key Cex, and transmitted on to the multiplexer and scrambler 2004.

Each service broadcast by a broadcast supplier in a data comprises a number of distinct components. For example, a television program includes a video component V, an audio component S, a sub-title or teletext component T, and so on (see FIG. 4). Each of these components of a broadcast is individually scrambled and encrypted for subsequent broadcast to the transponder 2014. A separate ECM is typically required for each scrambled component of the broadcast.

Program Transmission

The multiplexer 2004 receives electrical signals comprising encrypted EMMs from the SAS 3002, encrypted ECMs from the second encrypting unit 3014, and compressed programs from the compressor 2002. The multiplexer 2004 scrambles the programs and transmits the scrambled programs, the encrypted EMM (if present), and the encrypted ECMs as electric signals to a transmitter 2008 of the broadcast center via linkage 2010. The transmitter 2008 transmits electromagnetic signals towards the satellite transponder 2014 via uplink 2012.

Program Reception

The satellite transponder 2014 receives and processes the electromagnetic signals transmitted by the transmitter 2008 and transmits the signals on to the earth receiver 2018 via downlink 2016. The signals received by the receiver 2018 are transmitted to the integrated receiver/decoder 2020 owned or rented by the end user and connected to the end user's television set 2022. The receiver/decoder 2020 de-multiplexes the signals to obtain scrambled programs with encrypted EMMs and encrypted ECMs.

Note that if the program is not scrambled, the receiver/decoder 2020 decompresses the data and transforms the signal into a video signal for transmission to television set 2022.

If the program is scrambled, the receiver/decoder 2020 extracts the corresponding ECM from the MPEG-2 stream and passes the ECM to the daughter smart card 3020 of the end user. The smart card 3020 may, for example, be retrievably inserted into a slot or a smart card reader operatively coupled to the receiver/decoder 2020. The daughter smart card 3020 controls whether the end user has the right to decrypt the ECM and to access the program.

If the user does not have the necessary rights, a negative status is passed to the receiver/decoder 2020 to indicate that the program cannot be descrambled. If the end user does have the rights, the ECM is decrypted and the control word extracted. The decoder 2020 can then descramble the program using this control word. The MPEG-2 stream is decompressed and translated into a video signal onward transmission to television set 2022.

The levels of encryption used will be described in more detail in relation to FIG. 3 below.

Subscriber Management System (SMS)

A subscriber Management System (SMS) 3004 includes a database 3024 which manages, for example, all of the end user files, commercial offers (such as tariffs and promotions), subscriptions, PPV details, and data regarding end user consumption and authorization. The SMS may be physically remote from the SAS Each SMS 3004 transmits messages to the SAS 3002 via respective linkage 3006 to enable modifications to or creation of Entitlement Management Messages (EMMs) to be transmitted to end users. The SMS 3004 also transmits messages to the SAS 3002 that indicate a change in an end user's state (relating to the authorization granted to the end user when ordering products or to the amount that the end user wilt be charged).

Entitlement Management Messages (EMMs)

The EMM is a message dedicated to an individual end user (subscriber), or a group of end users (in contrast with an ECM, which is dedicated to one scrambled program only or a set of scrambled programs if part of the same commercial offer). A group may contain a given number of end users. This organization as a group aims at optimizing the bandwidth; that is, access to one group can permit access to a large number of end users.

Various specific types of EMMs are typically used in embodiments of the present invention. Individual EMMs are dedicated to individual subscribers, and are typically used in the provision of Pay Per View services. These EMMs generally comprise a group identifier and a position of a subscriber in that group. "Group" subscription EMMs are dedicated to groups of, for example, 256 individual users and are typically used in the administration of some subscription services. This EMM has a group identifier and a subscribers' group bitmap.

Audience EMMs are dedicated to entire audiences and might, for example, be used by a particular operator to provide certain free services. An "audience" may generally comprise a totality of subscribers having smart cards which bear the same Operator Identifier (OPI). Finally, a unique EMM is addressed to the unique identifier of the smart card.

Encryption Levels of the System

Figure 3:
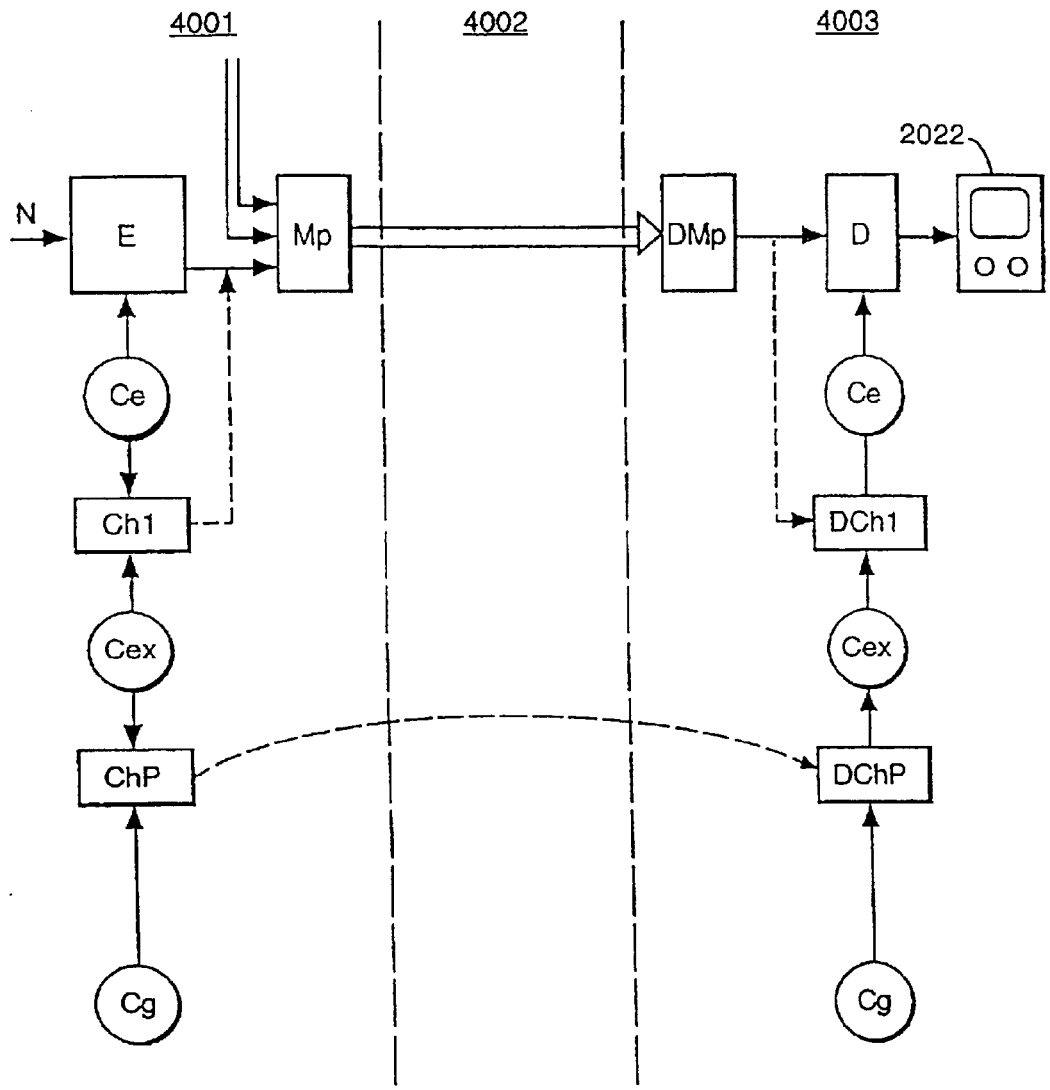
FIG. 3 shows different levels of encrypting in the television system.

Referring now to FIG. 3, the encryption levels in the broadcast system will now be described. The stages of encryption associated with the broadcast of the digital data are shown at 4001, along with the transmission channel 4002 (e.g., a satellite link as described above), and the stages of decryption at the receiver 4003.

Figure 4:
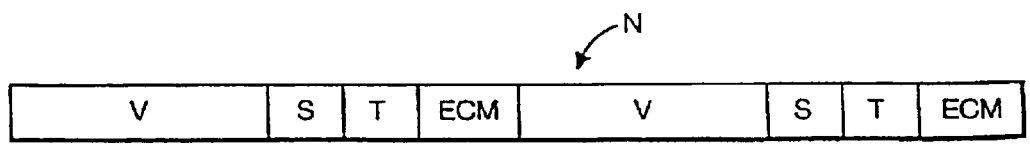
FIG. 4 shows a structure of a transmitted digital packet in the television system, including visual, audio, and teletext data, and an ECM message component.

Digital data N is scrambled by a control word Ce before being transmitted to a multiplexer Mp for subsequent transmission. As shown in FIG. 4, the transmitted data includes an ECM comprising, for example, the control word Ce as encrypted by an encrypter Chi controlled by a first encryption key Cex. At the receiver/decoder, the signal is processed by a de-multiplexer DMp and descrambler D before being passed to a television 2022 for viewing. A decryption unit DCh1, which also comprises the key Cex, decrypts the ECM in the demultiplexed signal to obtain the control word Ce subsequently used to descramble the transmission.

For security reasons, the control word Ce embedded in the encrypted ECM changes, for example, approximately every 10 seconds (although other time intervals may be selected within the scope of the invention). In contrast, the first encryption key Cex used by the receiver to decode the ECM is typically changed, for example, on a monthly basis by means of an EMM. The encryption key Cex is encrypted by a second unit ChP using a personalized key Cg corresponding to the identity of the decoder. If the decoder is one of those chosen to receive an updated key Cex, a decryption unit DChP in the decoder will decrypt the message using its key Cg to obtain that month's key Cex.

The decryption units DChp and DCh1 and the associated keys are held on a smart card provided to the subscriber and inserted in, for example, a smart card reader operatively coupled to the decoder. The keys may generated according to any known symmetric key algorithm, such as DES. Alternative embodiments using public/private key algorithms are equally possible.

Recording of Digital Data

Figure 5:
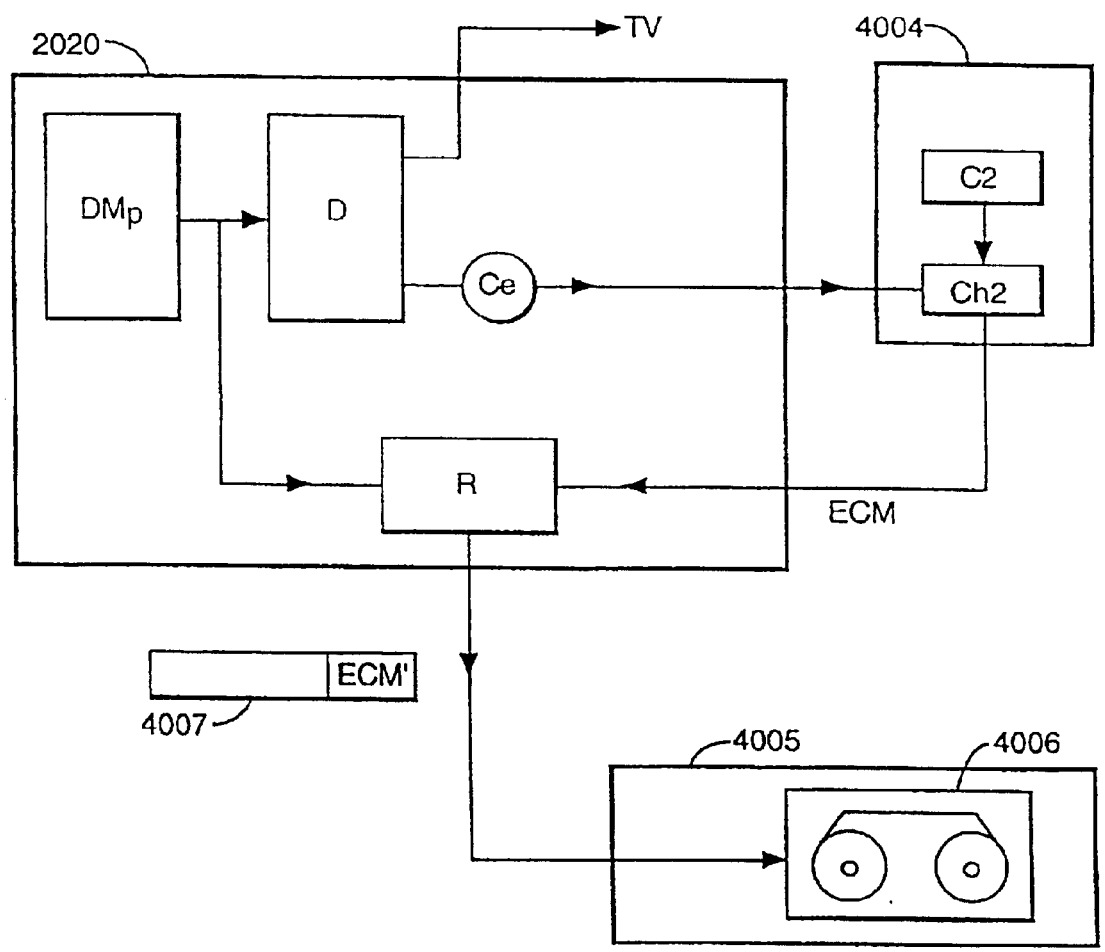
FIG. 5 shows an embodiment of the invention including a digital recording device and a smart card containing a second algorithm used to encrypt the code word to be registered on a digital video cassette.

As previously described, it is advantageous to prevent descrambled digital data from being recorded because of the risks that arise in relation to unauthorized copying and piracy. As shown in FIG. 5, the present invention provides a means for avoiding the recording of descrambled digital data.

The system comprises a smart card 4004, insertable in a smart card slot in the receiver/decoder, together with a digital recorder 4005, e.g. a DVHS recorder, including a digital recording medium 4006, such as a DVHS cassette.

In this embodiment, the received control word is decrypted by the associated smart card 3020 inserted in the decoder (see FIG. 2). The decoded control word Ce (together with any other data that forms the ECM, such as access control information, etc.) is then passed to the microprocessor embedded in the smart card 4004. Using a second encryption key C2 and second encryption algorithm Ch2, the smart card 4004 generates a new ECM, indicated as ECM' in FIG. 5. ECM' is then used to replace the ECM in the scrambled data stream from the de-multiplexer DMp as shown at 4007, and the combination of scrambled data and new entitlement message ECM' are recorded on the DVHS cassette 4006. The entitlement message ECM' may be inserted in the data stream circulating a shift control register R.

By this means, the invention avoids recording decoded audiovisual information on the cassette. In order to play the cassette, the smart card is reinserted in the decoder, the key C2 is used to decode the entitlement message ECM', and the subsequently extracted control word Ce used to control the decoder to descramble the program for viewing.

Figure 6:
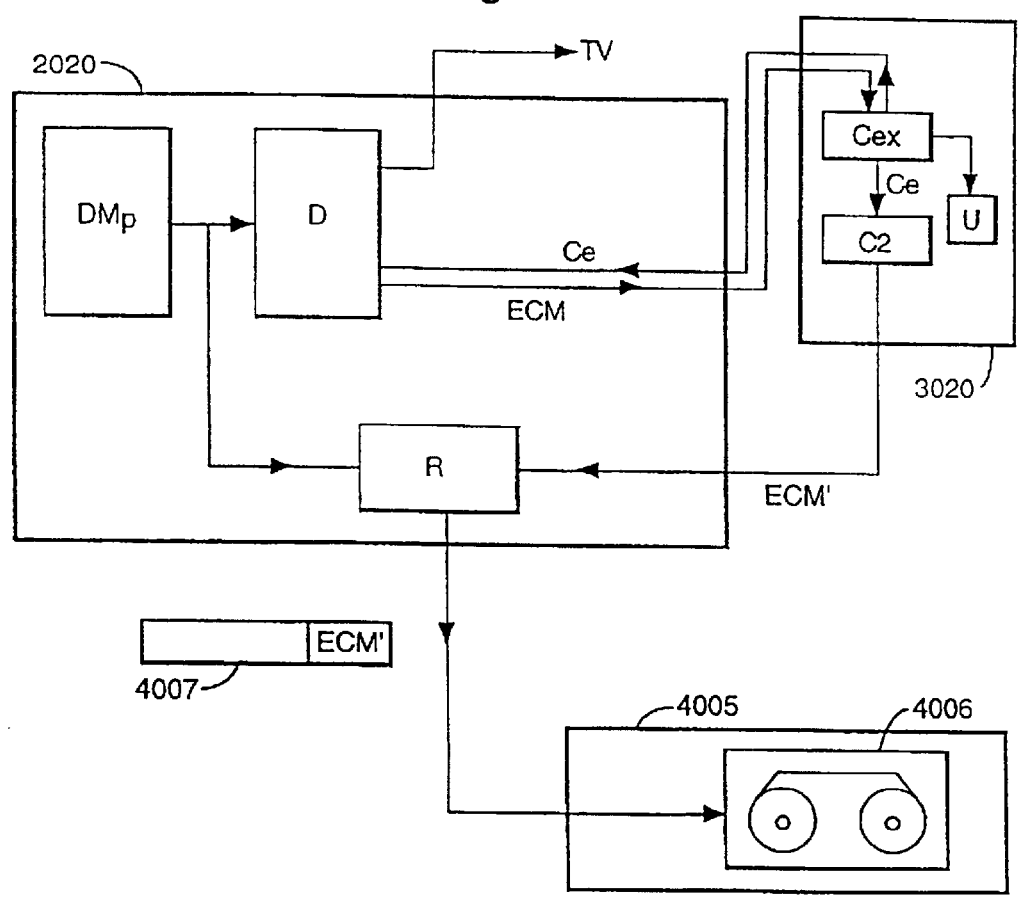
FIG. 6 shows an embodiment of the invention in which the smart card contains both the first and second keys necessary for viewing the transmitted and recorded program, respectively, together with credit units for determining the number of times a program may be watched.

In the system shown in FIG. 5, the smart card 4004 is different from the smart card 3020 shown in FIG. 2 of the television system and which contains the encryption keys necessary for viewing of the program. However, in the alternative embodiment shown in FIG. 6, the smart card 3020 contains both the first and second encryption keys Cex and C2 needed for viewing and recording the program. As represented, the key Cex controls the decryption of the ECM to generate the control word Ce used by the descrambler D to view the program and subsequently encrypted by the key C2 to form the new entitlement message ECM'.

The algorithms DCh1 and DCh2 have not been shown for reasons of space. The card 3020 is in fact usually also initialized with the personalized key Cg (not shown) enabling the decryption of EMMs so as to obtain that month's key Cex stored in the memory of the card. Although the smart card has been shown in the form of a substantially rectangular card, other physical forms, such as key shapes etc, are of course possible.

The smart cards discussed in the various embodiment of the invention are portable in that they may be used with any decoder and/or digital recording device. Therefore, because the relevant control words and/or keys are stored on a specific smart card, an individual user may access programming or recorded transmissions from any decoder and/or digital recording device adapted to be used with embodiments of the invention such that access is essentially independent of the identity of a specific decoder. Accordingly, a user may access programming from a second decoder disposed in another room, at a different location (e.g., at a different house), at a hotel etc. This aspect of the invention greatly improves access to, for example, television broadcasts and provides increased flexibility and value to the user.

Security of recorded digital data may be ensured by including a "key" or "code" in the recorded material that only enables access with one or more selected smart cards. For example, if a user records digital data, the smart card and recording may be adapted so that only that user or a select group of users (e.g., users within a family) can access the recorded material even though other users could use the same decoder to access normal programming. In this manner, portability of the smart cards enables the user to access his or her recorded programming but prevents the user from accessing the recorded material of other users.

The ECM transmitted with the program and decrypted by the card may also contain credit units U subsequently stored in the card and which control the number of times a recorded film may be viewed. In one embodiment, the credit units may be decremented during the replaying of the recorded film every time an ECM' passes by the decoder. Once the number of credits has been decremented to zero, indicating the recording has been viewed a predetermined number of times, a message is sent to the decoder to prevent further viewings of the film, unless the credit units are recharged (by, for example, a charging instruction sent in an EMM).

In alternative embodiments, the credit units may be decremented every ten or hundred ECM' messages. In other embodiments, the credit units may correspond to certain sections of the film (for example the first or last 10 minutes of the film), such that playing these sections will decrement the credit units associated therewith. The sections can be identified by tagging the ECM messages in these sections accordingly.

Figure 7:
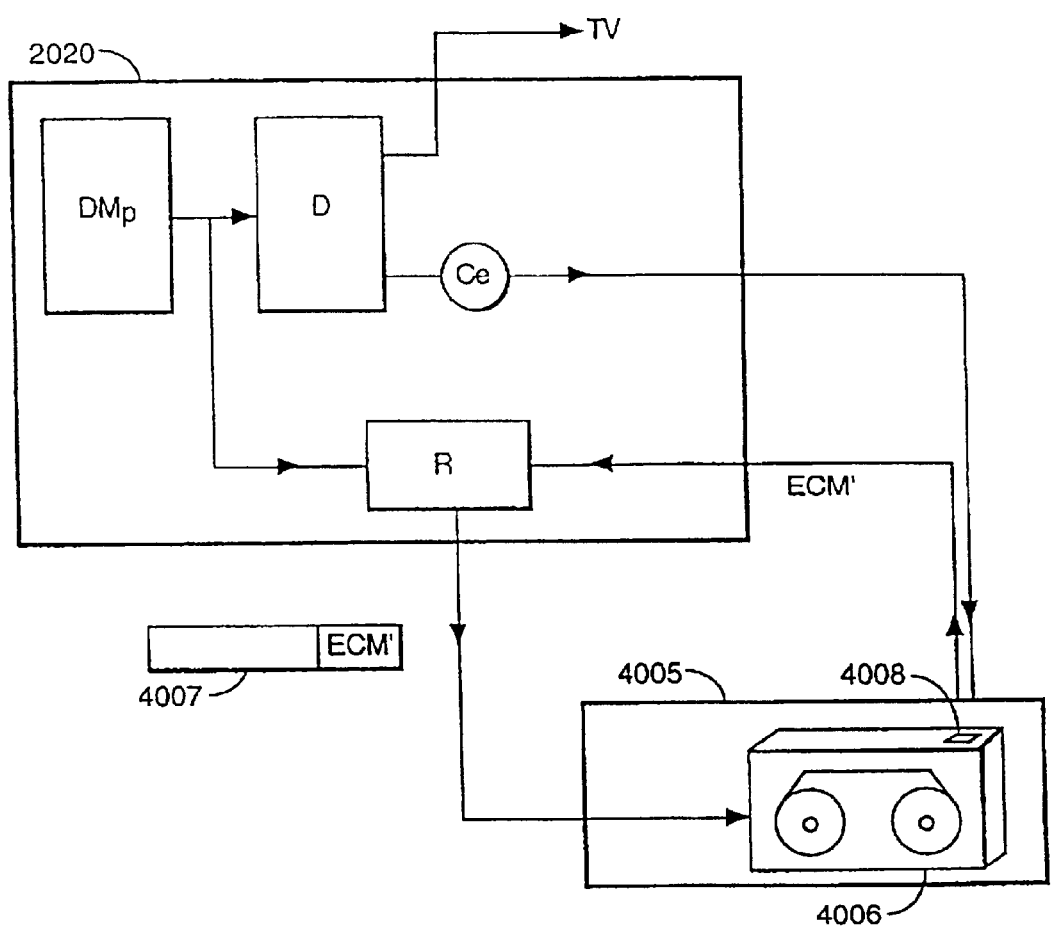
FIG. 7 shows an embodiment of the invention in which the second key is stored on an integrated circuit mounted in the casing of the digital video cassette.

A further embodiment of the invention is shown in FIG. 7. In this embodiment, the generation of the new entitlement message EMM' is controlled by an integrated circuit or chip 4008 possessing the second encryption key C2 and embedded in the casing of the recorded cassette 4006. In this example, a set of metallic contacts may be provided on an exterior surface of the cassette housing, the contacts leading to an electronic circuit, such as an integrated circuit or chip in the interior of the housing. These contacts may be engaged by a corresponding set of contacts in the receptacle of the recorder to enable communication between the integrated circuit and the video recorder.

This embodiment is advantageous because, while it is straightforward to copy the recorded (and scrambled) digital data, the data stored in the chip will be resistant to copying and, as with the previous embodiments, the scrambled data will be useless without the key C2 necessary to unlock the ECM' to obtain the control word used by the descrambler.

As will be understood, in all embodiments described, the elements of the receiver/decoder and the digital recording device may be combined or interchanged, such that the digital recorder possesses a smart card slot for receiving a smart card, for example, and/or the necessary elements to descramble the program once the control word Ce has been extracted from the ECM' message. The decoder and/or digital recorder may equally be integrated together with other devices, such as a television for example.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of recording digital data scrambled using a control word encrypted with a first key, the scrambled data being received together with the control word encrypted with the first key, the method comprising:
   receiving the encrypted control word and decrypting the control word with a decoder comprising an equivalent of the first key;
   re-encrypting the decrypted control word with a second key store in a portable support device adapted to be releasably received by the decoder, the portable support device adapted for use with a plurality of decoders; and
   recording the re-encrypted control word and the scrambled digital data on a digital recording medium.

2. The method of claim 1, wherein the portable support device comprises a smart card adapted to be releasable received by a smart card reader operatively coupled to the decoder.

3. The method of claim 2, wherein the smart card comprises the equivalent of the first key.

4. The method of claim 2, wherein the first key is separate from the second key that is stored on the smart card.

5. The method of claim 2, wherein a single smart card is used to generate the re-encrypted control word for a plurality of recordings.

6. The method of claim 2, wherein the smart card comprises credit units used to determine how many times the recorded digital data may be replayed.

7. The method of claim 6, wherein the credit units are decremented after each playing of the recorded digital data.

8. The method of claim 6, wherein the credit units are associated with a particular segment of the recording so that playing a selected segment of the recording decrements a selected number of credit units associated with that selected segment.

9. The method of claim 6, wherein the credit units are decremented after the playing of any segment of the recording.

10. The method of claim 1, wherein the portable support device comprises the digital recording medium, the second key being stored in a circuit disposed proximate the digital recording medium.

11. The method of claim 10, wherein the circuit is embedded in a housing that encloses the digital recording medium.

12. A method of recording digital data scrambled using a control word encrypted with a first key, the scrambled data being received together with the control word, the method comprising:
   receiving the encrypted control word and decrypting the control word with a digital recorder comprising an equivalent of the first key;
   re-encrypting the decrypted control word with a second key stored in a portable support device adapted to be releasably received by the digital recorder, the portable support device adapted for use with a plurality of digital recorders; and
   recording the re-encrypted control word and the scrambled digital data on a digital recording medium operatively coupled to the digital recorder.

13. The method of claim 12, wherein the portable support device comprises a smart card adapted to be releasable received by a smart card reader operatively coupled to the digital recorder.

14. The method of claim 13, wherein the smart card comprises the equivalent of the first key.

15. The method of claim 13, wherein the first key is separate from the second key that is stored on the smart card.

16. The method of claim 13, wherein a single smart card is used to generate the re-encrypted control word for a plurality of recordings.

17. The method of claim 13, wherein the smart card comprises credit units used to determine how many times the recorded digital data may be replayed.

18. The method of claim 17, wherein the credit units are decremented after each playing of the recorded digital data.

19. The method of claim 17, wherein the credit units are associated with a particular segment of the recording so that playing a selected segment of the recording decrements a selected number of credit units associated with that selected segment.

20. The method of claim 17, wherein the credit units are decremented after the playing of any segment of the recording.

21. The method of claim 12, wherein the portable support device comprises the digital recording medium, the second key being stored in a circuit disposed proximate the digital recording medium.

22. The method of claim 21, wherein the circuit is embedded in a housing that encloses the digital recording medium.

23. An apparatus for recording digital data scrambled using a control word encrypted with a first key, the scrambled data being received together with the control word encrypted with the first key, the apparatus comprising:
   a decoder that receives the encrypted control word and decrypts the control word; and
   a portable support device comprising a second key and adapted to be releasably received by the decoder, the decoder adapted to re-encrypt the decrypted control word using the second key and to record the re-encrypted control word and the scrambled digital data on a digital recording medium, the portable support device adapted for use with a plurality of decoders or digital recorders.

24. The apparatus of claim 23, wherein the decoder comprises a digital recording device adapted to record the encrypted control word and digital data.

25. A smart card adapted to be received in a smart card reader in a decoder, configured to:
   receive from the decoder a control word encrypted using a first key;
   access an equivalent first key necessary to decrypt the control word,
   re-encrypt the decrypted control word using a second key; and
   transmit the re-encrypted control word to a digital recording device for recording on a digital recording medium.

26. The smart card of claim 25, wherein the smart card comprises credit units to determine how many times a recording may be replayed, wherein the credit units are decremented with each partial or complete playing of the recording.

* * * * *

UNITED STATES PATENT AND TRADEMARK OFFICE
CERTIFICATE OF CORRECTION

PATENT NO. : 6,987,854 B2 Page 1 of 1
APPLICATION NO. : 09/928648
DATED : January 17, 2006
INVENTOR(S) : Michel Maillard It is certified that error appears in the above-identified patent and that said Letters Patent is hereby corrected as shown below:

Title page,
Item [30], Foreign Application Priority Data, should read -- EP 97402238.6 filed 09/25/1997. --.

Column 9,
Line 15, replace "store" with -- stored --.

Signed and Sealed this

Eleventh Day of July, 2006

JON W. DUDAS
*Director of the United States Patent and Trademark Office*